United States Patent
Matsuo

(10) Patent No.: US 11,983,446 B1
(45) Date of Patent: May 14, 2024

(54) INDUSTRIAL PRINTING SYSTEM, PRINT SERVER, AND PROCESS MANAGEMENT METHOD FOR PEER-TO-PEER DISTRIBUTED PROCESSING IN COMBINATION OF PRODUCTION PRINTING APPARATUSES

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/982,456

(22) Filed: Nov. 7, 2022

(51) Int. Cl.
*G06F 3/12* (2006.01)
*G06K 15/02* (2006.01)

(52) U.S. Cl.
CPC .......... *G06F 3/1206* (2013.01); *G06F 3/1259* (2013.01); *G06K 15/1836* (2013.01)

(58) Field of Classification Search
CPC .. G06F 3/1206; G06F 3/1259; G06K 15/1836
See application file for complete search history.

(56) References Cited

U.S. PATENT DOCUMENTS

| | | | | |
|---|---|---|---|---|
| 6,608,697 B1 * | 8/2003 | Schorr | | G06Q 10/10 358/1.14 |
| 2009/0279137 A1 * | 11/2009 | Mori | | G06F 3/1264 358/1.15 |
| 2015/0156351 A1 | 6/2015 | Yamamoto | | |
| 2015/0293734 A1 * | 10/2015 | Shirai | | G06F 3/121 358/1.15 |
| 2016/0105484 A1 * | 4/2016 | Haas | | H04L 67/025 709/203 |
| 2016/0266855 A1 * | 9/2016 | Mitsui | | G06F 3/1255 |
| 2021/0405937 A1 * | 12/2021 | Takenaka | | G06F 3/1206 |

FOREIGN PATENT DOCUMENTS

JP 2015-107555 A 6/2015

* cited by examiner

*Primary Examiner* — Juan M Guillermety
(74) *Attorney, Agent, or Firm* — Hawaii Patent Services; Nathaniel K. Fedde; Kenton N. Fedde

(57) ABSTRACT

Provided is an industrial printing system that efficiently manages distributed processing of production printing on a peer-to-peer basis. Industrial printing systems perform production printing and include multiple print servers. A plurality of print servers performs distributed processing of jobs. The storage unit stores capability information indicating capabilities that can be processed in rasterizing process, printing processing, and post-processing. The processing determination unit checks job processing requirement based on the capability information stored in the storage unit, and it determines a combination of any of a plurality of print servers, printing apparatuses, and post-processing apparatuses capable of processing the job. The processing management unit transmits a job to each apparatus and requests processing according to the combination determined to be processable by the processing determination unit.

17 Claims, 7 Drawing Sheets

INDUSTRIAL PRINTING SYSTEM, PRINT SERVER, AND PROCESS MANAGEMENT METHOD FOR PEER-TO-PEER DISTRIBUTED PROCESSING IN COMBINATION OF PRODUCTION PRINTING APPARATUSES

BACKGROUND

The present disclosure relates to industrial printing systems, print servers, and process management methods with distributed processing, particularly for industrial printing (production printing).

Among print systems that typically include a plurality of printers, there are print systems that perform so-called ubiquitous printing. In this system, when a print system including a plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the predetermined order from the first MFP to the Nth MFP. This saves the ubiquitous job in the memory of the MFP that can process it. As a result, in the printing system, it is possible to reduce the waiting time until the user obtains the printed matter.

That is, in this typical technique, print data (job) is transferred as it is to each MFP, and it is determined whether or not the transferred MFP itself can process the data.

On the other hand, in an industrial printing called production printing, which uses a commercial (industrial) printing apparatus, the component members of the final product are produced by dividing the work into a plurality of processes. For example, in the case of bookbinding, covers, body (color), body (black and white), promotional items, bands, shipping envelopes, or the like, are processed as different jobs. Then, in the middle of the process, each job is combined and finished as a book as the final product (order).

SUMMARY

An industrial printing system of the present disclosure is an industrial printing system for production printing having a plurality of print servers for distributed processing of a job, and each of the plurality of print servers including: a storage unit that stores capability information indicating processable capability in rasterizing process, printing process, and post-processing process; a processing determination unit that confirms a processing requirement of the job based on the capability information stored in the storage unit and determine a combination of one of the plurality of print servers, a printing apparatus, and a post-processing apparatus capable of processing the job; and a processing management unit that transmits the job to each apparatus to request processing according to the combination determined to be processable by the processing determination unit.

A print server of the present disclosure is a print server that performs distributed processing of a job in an industrial printing system that performs production printing, including: a storage unit that stores capability information indicating processable capability in rasterizing process, printing process, and post-processing process; a processing determination unit that confirms a processing requirement of the job based on the capability information stored in the storage unit and determine a combination of one of the plurality of print servers, a printing apparatus, and a post-processing apparatus capable of processing the job; and a processing management unit that transmits the job to each apparatus to request processing according to the combination determined to be processable by the processing determination unit.

A process management method of the present disclosure is a process management method performed by an industrial printing system for production printing having a plurality of print servers for distributed processing of a job, including the steps of: storing capability information indicating processable capability in rasterizing process, printing process, and post-processing process; confirming a processing requirement of the job based on the stored capability information; determining a combination of one of the plurality of print servers, a printing apparatus, and a post-processing apparatus capable of processing the job; and transmitting the job to each apparatus to request processing according to the combination determined to be processable.

DETAILED DESCRIPTION

<Embodiment>
[Configuration of Industrial Printing System X]

Figure 1:
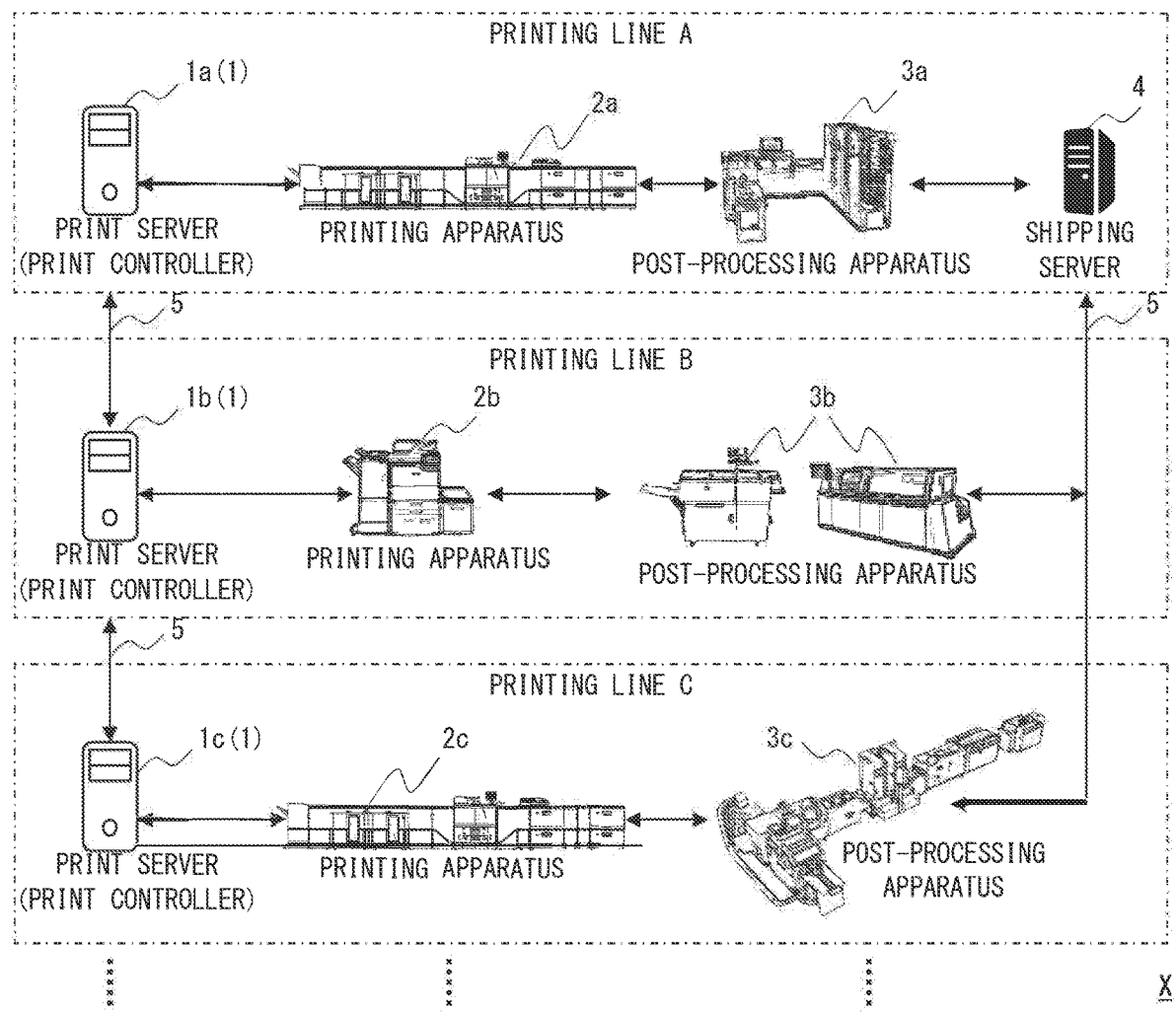
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing process and a post-processing process (hereinafter also simply referred to as "printing") in industrial printing (production printing).

Figure 3:
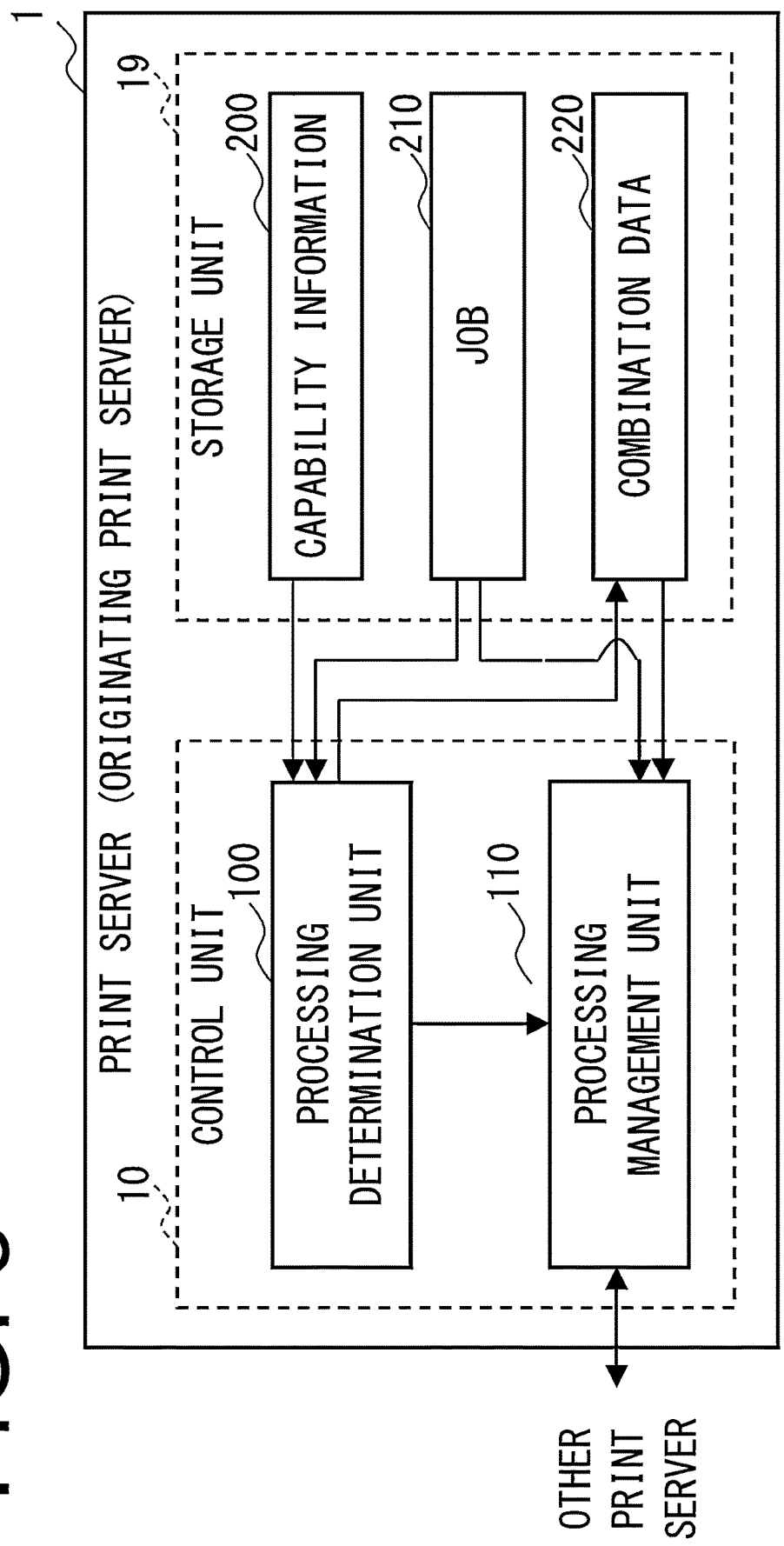
FIG. 3 is a block diagram showing the functional configuration of the print server as shown in FIG. 1.

Here, in the industrial printing system X of the present embodiment, a final product such as a book, or the like, to be output is defined as an "order," and each component of the order is defined as a job 210 (FIG. 3).

In the industrial printing system X, sites (printing lines) are connected by a network 5 and cooperated. In the present embodiment, the site is a printing company, a printing factory, or the like, which includes the print server 1 and the component apparatus (es) for production printing. The component apparatuses include printing apparatus 2, a post-processing apparatus 3, a shipping server 4, and the like.

FIG. 1 shows an example in which the print servers 1a, 1b, 1c, . . . in the printing lines A, B, C, . . . and the shipping server 4 of the printing line A are connected via a network 5 as an example of this cooperation between sites. Further, in this example, printing apparatuses 2a, 2b, 2c, . . . and post-processing apparatuses 3a, 3b, 3c, . . . are connected to the printing lines A, B, C, . . . .

Hereinafter, any one of these print servers 1a, 1b, 1c, is simply be referred to as print server 1. Similarly, when referring to any one of printing apparatuses 2a, 2b, 2c, . . . is simply referred to as printing apparatus 2. Similarly, any one of the post-processing apparatuses 3a, 3b, 3c, . . . is simply referred to as the post-processing apparatus 3.

The print server 1 is an information processing apparatus serving as a print controller that manages and controls printing-related apparatuses (hereinafter referred to as "component apparatuses") including the printing apparatus 2 and post-processing apparatus 3 provided at each site. The print server 1 is configured as a PC (Personal Computer) server, a dedicated machine, a general-purpose machine, or the like.

In the present embodiment, the print server 1 performs peer-to-peer distributed processing of the job 210 (FIG. 3) for production printing by executing dedicated print management application software (hereinafter simply referred to as "application"). This print management application (hereinafter referred to as a "dedicated application") may run on a common platform that provides print design creation, user management, tenant management, security management, maintenance notification service, prepress processing management, storage management of each document, and management of the printing apparatus 2, or the like.

Specifically, in the production printing, the print server 1 transmits and receives various instructions and information to and from the printing apparatus 2, the post-processing apparatus 3, the shipping server 4, and the like. As a result, the print server 1 manages the status of each apparatus and requests processing of the job 210.

In the present embodiment, the print server 1 schedules at least a part of the job 210 with the requesting print server 1 (originating print server) or other print server 1 receiving the processing request. Then, the originating print server or the other print server 1 that executes the processing distributes the processing of the job 210 to each component apparatus in the site and causes the processing to be executed according to the schedule.

The printing apparatus 2 includes an industrial printer including an image forming apparatus that performs small-lot printing, an automated printing apparatus 2 that performs multi-lot (large-volume) offset printing, or the like.

The printing apparatus 2 at each site according to the present embodiment may differ in size, quality, color profile, recordable range, or the like, of recording paper used in the printing process.

The post-processing apparatus 3 is a post-processing apparatus for executing post-processing processes such as folding, collating, bookbinding, cutting, and the like, for recording paper printed by the printing apparatus 2.

The post-processing apparatus 3 at each site according to the present embodiment may also differ in the contents, range, or the like, of processes that can be executed in the post-processing step.

The shipping server 4 is a server that manages the shipping of the order sent from each site after the printing process or post-processing process is completed.

In the present embodiment, an example of using the shipping server 4 at the site of company A is described, but the shipping server 4 may be provided at the other sites.

The network 5 is a LAN (Local Area Network), a wireless LAN (Wi-Fi), a WAN (Wide Area Network), a mobile telephone network, an industrial network, a voice telephone network, other dedicated lines, or the like. The network 5 can transmit and receive various commands and data to and from each apparatus. Furthermore, the print server 1 and each component apparatus may also be connected via a LAN, or the like, in the network 5. In addition, the network 5 may be configured with a VPN (Virtual Private Network), or the like.

In addition, a plurality of these apparatuses may exist according to the application, the scale of printing, and the like. Each apparatus can be connected to the print server 1 by various protocols via the network 5, LAN, or the like. Substitutionally, the print server 1 and each apparatus may be directly connected by wire and by using various interfaces.

Further, each site may have the other component apparatuses managed by the print server 1. The other component apparatuses include, for example, a terminal for manuscript submission, a terminal for design proofreading, a prepress apparatus, and the like.

Furthermore, an administrator terminal or a general-purpose terminal including a console used by an administrator or a user may be connected via the network 5 from inside and outside each site. As a result, each print server 1 can be accessed by the administrator or the user by using a web browser, a terminal, a dedicated application, or the like, on the administrator terminal, the console, or the like. As a result, acquiring or creating the job 210, creating print design, submitting manuscript, managing prepress processing, checking the progress status, requesting processing, and the like can be performed.

[Control Configuration of Print Server 1]

Figure 2:
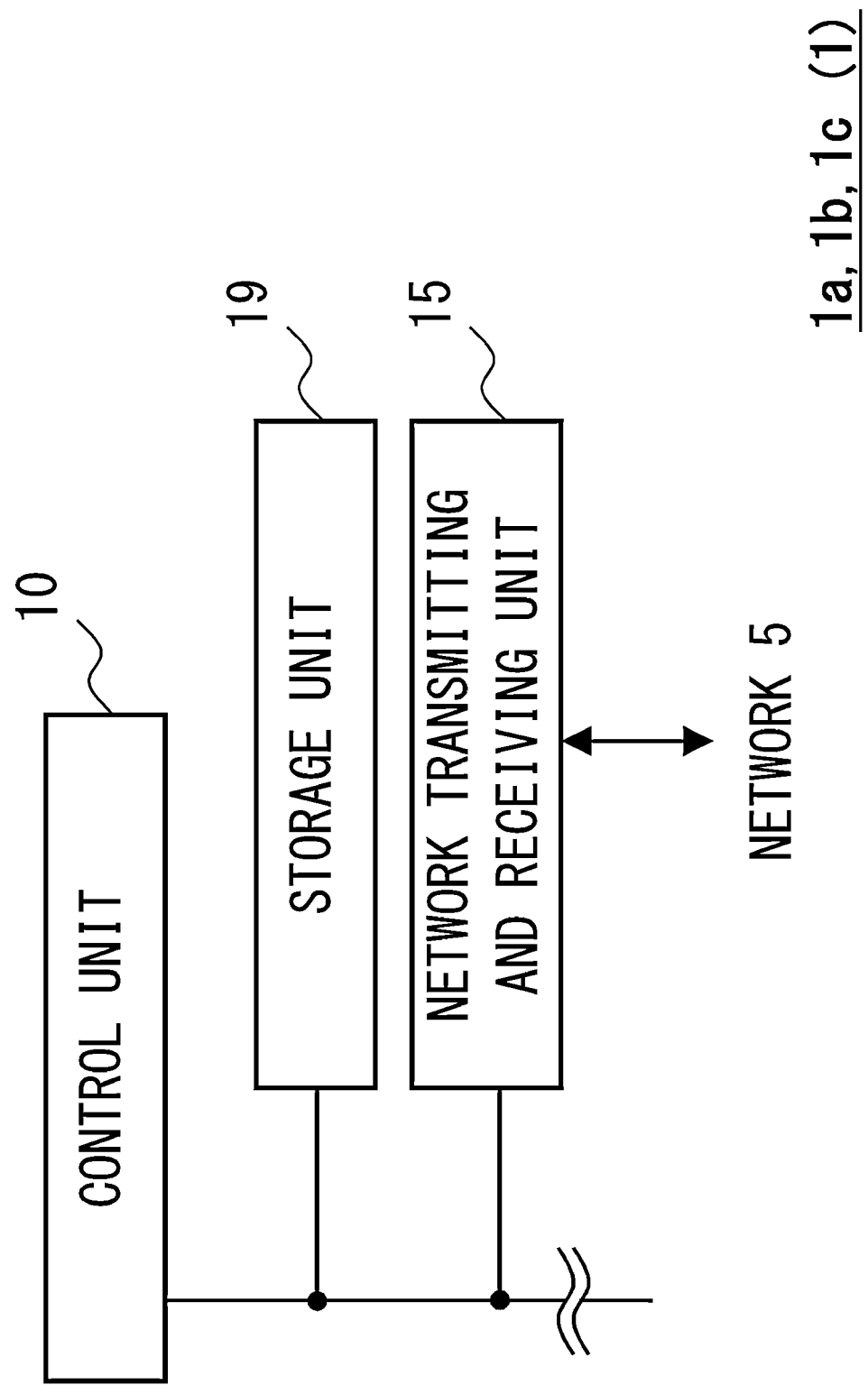
FIG. 2 is a block diagram showing the control configuration of the print server shown in FIG. 1.

Next, with referring to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 is information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, an application-specific processor), or the like.

The control unit 10 reads a control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal or the console.

The network transmitting and receiving unit 15 is a network connection unit including a LAN board, a wireless transmitting and receiving device, or the like, for connecting to the external network 5.

The network transmitting and receiving unit 15 transmits and receives data through a data communication line, and it transmits and receives voice signals through a voice telephone line.

The storage unit 19 is a non-transitory recording medium as a semiconductor memory such as ROM (Read Only Memory), RAM (Random Access Memory), or the like, or HDD (Hard Disk Drive), or the like.

The control program for controlling the operation of the print server 1 is stored in the ROM or HDD of the storage unit 19. The control program includes an OS (Operating System), middleware on the OS, services (daemons), various applications, database data, and the like. Among these, the various applications include the printing process management application as described above.

In the present embodiment, the storage unit 19 stores a program and data to perform a raster image processor (hereinafter abbreviated as "rasterize" or "RIP") for converting vector (line drawing) image data into image data for printing (raster data). The programs and data for the rasterizing process also include a commercial library, a plug-in, font, and the like. In addition, the storage unit 19 also stores information, control programs, and the like, for the component apparatuses existing in the same site (print line).

Furthermore, the storage unit 19 may also store account settings of the administrator and the user of the industrial printing system X, other data, and the like.

In addition, in the print server 1, the control unit 10 may be integrally formed, such as a CPU having built-in GPU, chip-on-module package, SOC (System On a Chip), or the like.

Also, the control unit 10 may have built-in RAM, ROM, flash memory, or the like.

[Functional Configuration of Print Server 1]

Here, with reference to FIG. 3, a functional configuration of the print server 1 is described.

The control unit 10 of the print server 1 includes a processing decision unit 100 and a processing management unit 110.

The storage unit 19 stores capability information 200, a job 210 and combination data 220.

The processing determination unit 100 confirms capability required for processing the job 210 (hereinafter referred to as "processing requirement") based on the capability information 200 stored in the storage unit 19. Then, the processing determination unit 100 determines a combination of any one of the plurality of print servers 1, the printing apparatus 2, and the post-processing apparatus 3 that is capable of processing the job 210. The processing determination unit 100 stores the determined combination as the combination data 220 in the storage unit 19.

The processing determination unit 100 confirms the print instruction attribute of the job ticket 350 and the designated attribute of the job information 340 for the job 210, and it determines the combination.

At this time, the processing determination unit 100 can determine the combination according to information on a commercial library and plug-in processing.

If there is no combination that fulfills the processing requirement, the processing determination unit 100 makes a change based on the substitution setting 330, and it presents the change to the user.

Further, the processing determination unit 100 can add and/or change the capability information 200 according to the content of the job 210.

The processing management unit 110 transmits the job 210 to each apparatus to request processing according to the combination determined to be processable by the processing determination unit 100. In this case, the processing management unit 110 may encrypt the job 210 and transmit it.

Further, the processing management unit 110 can transmit and receive a processing status notification and a completion notification of the job 210 between the print servers 1 corresponding to the combination, and it can manage the processing of the job 210.

The capability information 200 is a table, or the like, indicating the capability that can be processed by component apparatuses provided at a site managed by the print server 1 (hereinafter referred to as "processing capability"). The processing capacity includes the capacity of the printing process (printing step) by the printing apparatus 2 and the capacity of the post-processing process (post-processing step) by the post-processing apparatus 3.

In the present embodiment, the capability information 200 is shared among the print servers 1. In other words, each print server 1 stores in the storage unit 19 the capability information 200 of the plurality of print servers 1 (group) corresponding to each site capable to cooperate with each other.

The details of the capability information 200 is described later.

The job 210 is data in which various data used at the time of printing in production printing are put together. The job 210 may be described, for example, in JDF (Job Description Format) and/or JMF (Job Messaging Format).

The details of the job 210 is described later.

The combination data 220 is data indicating a combination of one of the plurality of print servers 1 (the other print server), the printing apparatus 2, and the post-processing apparatus 3 that can process the job 210. FIG. The job 210 is sent to the other print server 1 according to this combination data 220.

(Details of Capability Information 200)

Figure 4:
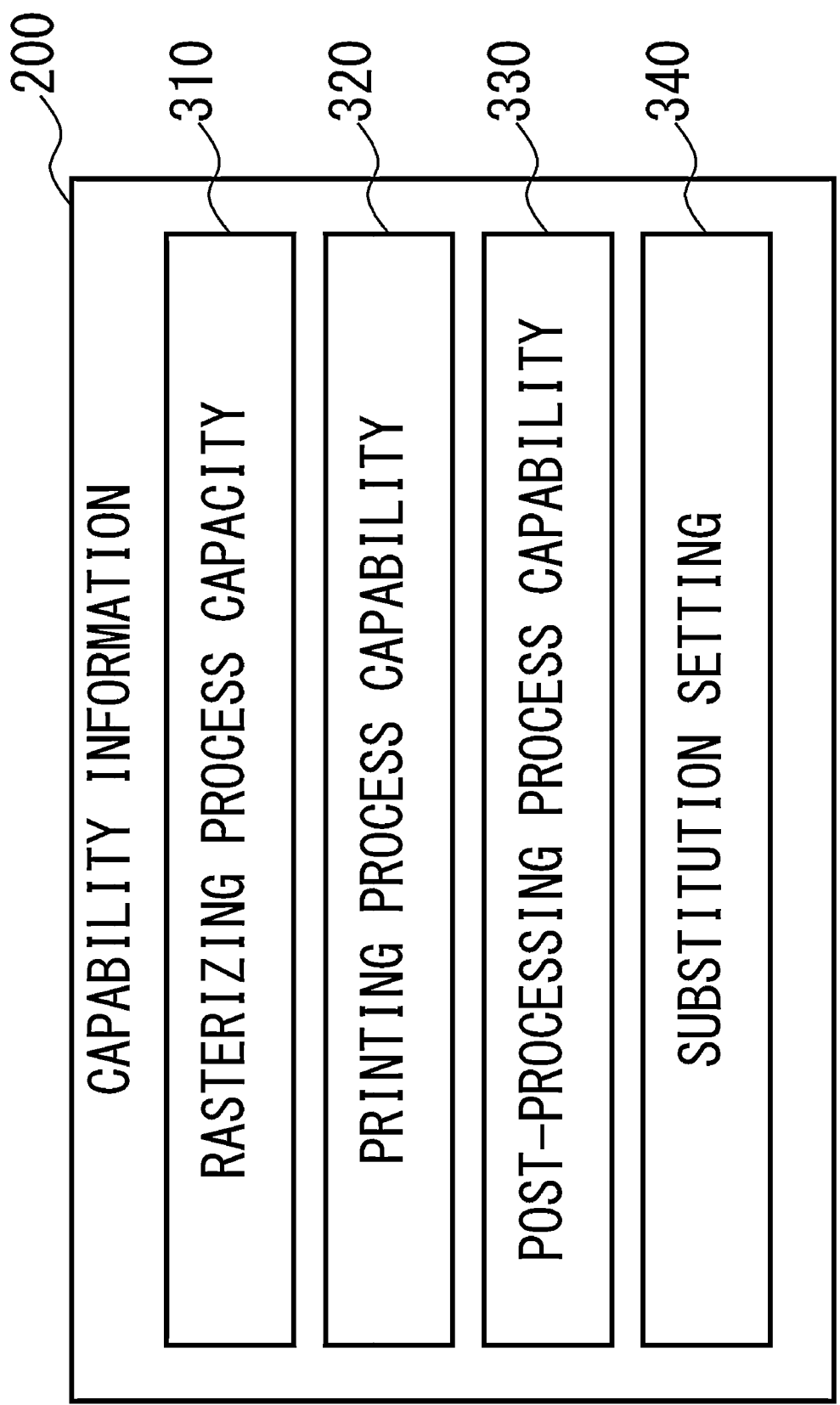
FIG. 4 is a block diagram showing details of the capability information as shown in FIG. 3.

Next, with reference to FIG. 4, the details of the capability information 200 is described.

In the present embodiment, the capability information 200 includes rasterizing process capability 300, printing process capability 310, post-processing process capability 320, and a substitution setting 330.

The rasterizing process capability 300 is data indicating the processing capability of the print server 1 when performing rasterization. The rasterizing process capability 300 include, for example, color profile information, spot color information, font information, image processing information, and plug-in information.

The color profile information is color gamut (color profile) information. The color profile information includes data such as an ICC profile, or the like.

The spot color information is information on the spot color that is one of special color(s) for designating colors other than normal CMYK (Cyan, Magenta, Yellow, Key plate). Specifically, the spot color information includes information on commercial libraries related to color designation. The commercial libraries include PANTONE(R) HKS, DIC(R), TOYO(R), and the like.

The font information is information such as usable commercial fonts, or the like.

The image processing information is information indicating available image processing and its capability. The image processing information includes, for example, presence or absence of image enhancement, skew correction, and the like.

The plug-in information is information related to plug-in processing. The plug-in information includes processing and capability information such as imposition, preflight and preflight profile, or the like, as the plug-in processing.

The printing process capability 310 is data indicating the processing capability when the printing apparatus 2 performs printing process. The printing process capability 310 include, for example, paper information, ink information, resolution information, and printable paper information.

The paper information includes information such as paper type, tray information, size, orientation, and the like. Additionally, the paper information may include information such as stock status of available papers, or the like.

The ink information is information such as color, monochrome, other supported colors, spot colors, and other special colors. The other special colors include special designations such as metallic colors, UV curable inks, and the like. In addition, the ink information may include remaining ink amount and spare ink information.

The resolution information is information indicating the resolution at the time of printing. For example, as the resolution information, a value such as 600 dpi (dot per inch), 1200 dpi, or the like, is set.

In addition, the printing process capability 310 may include information such as presence or absence of halftone, trapping, scaling, and borderless printing, inventory status of the resources required for printing, and the like.

The post-processing process capability 320 is data indicating the processing capability of the post-processing apparatus 3 when processing after printing (post-processing) is performed.

The cutting information includes whether or not cutting is possible, the maximum thickness, and other information necessary for cutting.

The folding information includes information such as whether or not folding is possible, or the like.

The bookbinding information includes information such as whether bookbinding is possible, possible bookbinding types, or the like.

The post-processing process capability 320 may also include information about the processing capabilities of other post-processing apparatuses. For example, post-processing process capability 320 may include information such as whether streaking, perforation, binding, and punching are possible or not. In addition, post-processing process capability 320 may include information such as the stock status of the post-processing resources, the stock status of consumables, and the like.

The substitution setting 330 is setting information for substitutable capability, which is a capability that can be substitutionally used.

In the substitution setting 330, for example, whether or not a color profile, a spot color, a font, or the like, can be substituted is set. In addition, the substitution setting 330 allows setting such as to what extent substitution is permitted if substitution is possible, or the like.

(Details of Job 210)

Figure 5:
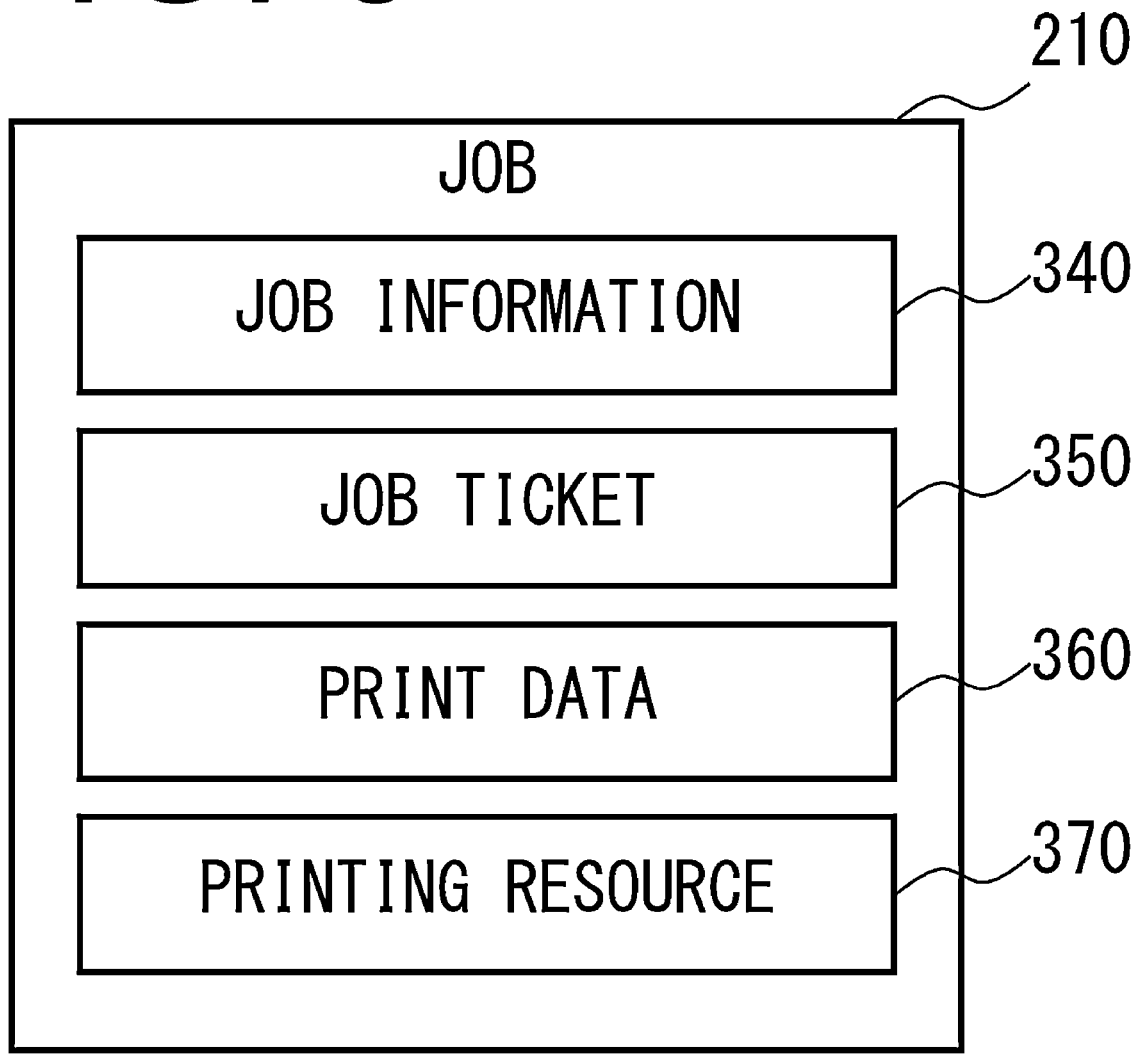
FIG. 5 is a block diagram showing details of the job as shown in FIG. 3.

Then, with reference to FIG. 5, details of the job 210 is described.

In the present embodiment, data mainly used in the rasterizing, printing step, and post-processing step in the job 210 is described.

The job 210 includes job information 340, job ticket 350, print data 360, print resource 370, and the like.

The job information 340 is data including attributes specified in printing process (hereinafter referred to as "designated attributes"). In the job information 340, as designated attributes, the type of the job 210, the name of the job 210, the name of the project (order), the designation of the printing apparatus 2 or the post-processing apparatus 3, the number of copies, whether or not performing collation, whether or not performing recording, the trimming mm number, print direction, print state, priority, or the like, are set. Among these, the type of job 210 includes a job of a printing step (printing job) and a job of a post-processing step (post-processing job).

The job ticket 350 is setting data including a print instruction attribute for requesting the job 210. The job ticket 350 includes, as the print instruction attribute, lower-level settings in the workflow, which are order settings. The setting includes, for example, settings necessary in the printing process and post-processing process, such as color profile designation, imposition designation, paper designation, bookbinding designation, and the like. In the present embodiment, the job ticket 350 may include reservation information designating the printing apparatus 2 or post-processing apparatus 3.

The job ticket 350 may also be written in JDF and/or JMF.

The print data 360 is data of a print manuscript in which a design is set according to the order. The print data 360 may be, for example, electronic document data such as PDF (Portable Document Format) or the like, PS (Postscript) data, other type vector data, data for manuscript submission format, other raster image data, and the like.

The print resource 370 is information on various resources required for printing instructions such as color profiles, spot colors, fonts, and the like. These various resources correspond to the capability information 200.

The other resource data required for printing are also included in the print resource 370.

In addition, job 210 may include processing change information. The processing change information is record information of changes during processing of the job 210. The processing change information may include, for example, information such as content of correction when there is a delay in each print server 1, a change in a processing result in printing, or the like. The content of correction includes, for example, a change in the number of copies or pages, an alternate profile, correction of imposition position, correction of milling designation, correction of cutting width, and the like.

Additionally, job 210 may include rasterized image data based on job ticket 350. The image data may be, for example, TIFF or other bitmap data. In addition, the image data may be lossless or lossy compressed.

In addition, the storage unit 19 may store schedule information indicating the status of the schedule regarding execution of each job 210. As the schedule information, for example, a schedule such as available, tentative reservation of the job 210, and busy of the job 210 are set for each time zone of the printing step and the post-processing step. Further, when the job 210 is tentatively reserved and reserved in the schedule, the ID, type, component apparatus to be used, status, or the like, for the job 210 are set as the contents of the job 210. Among these, the status of the job 210 includes the progress (delay) status of the job 210 to be processed and the previous job 210. Furthermore, the schedule information may also reflect the operating status of each component apparatus.

Here, the control unit 10 of the print server 1 is caused to function as the processing determination unit 100 and the processing management unit 110 by executing the control program stored in the storage unit 19.

Also, each unit of the print server 1 described above serves as a hardware resource for executing the process management method according to the present disclosure.

In addition, a part or any combination of the functional configurations as described above may be configured in terms of hardware or a circuit by using an IC, programmable logic, FPGA (Field-Programmable Gate Array), or the like.

[Job Distributed Execution Processing by Print Server 1]

Figure 6:
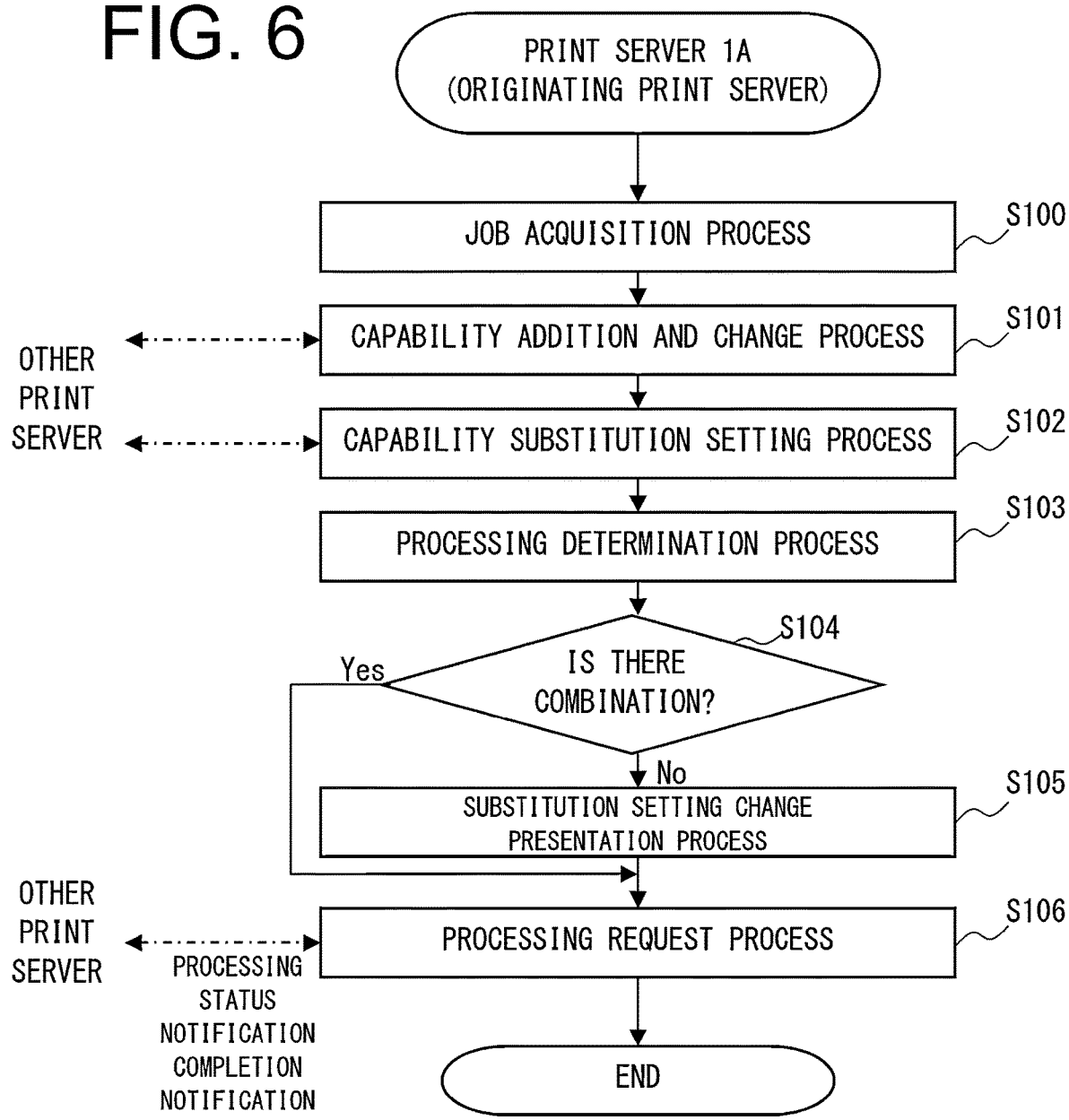
FIG. 6 is a flowchart of job distribution execution process according to the embodiment of the present disclosure.
Figure 7:
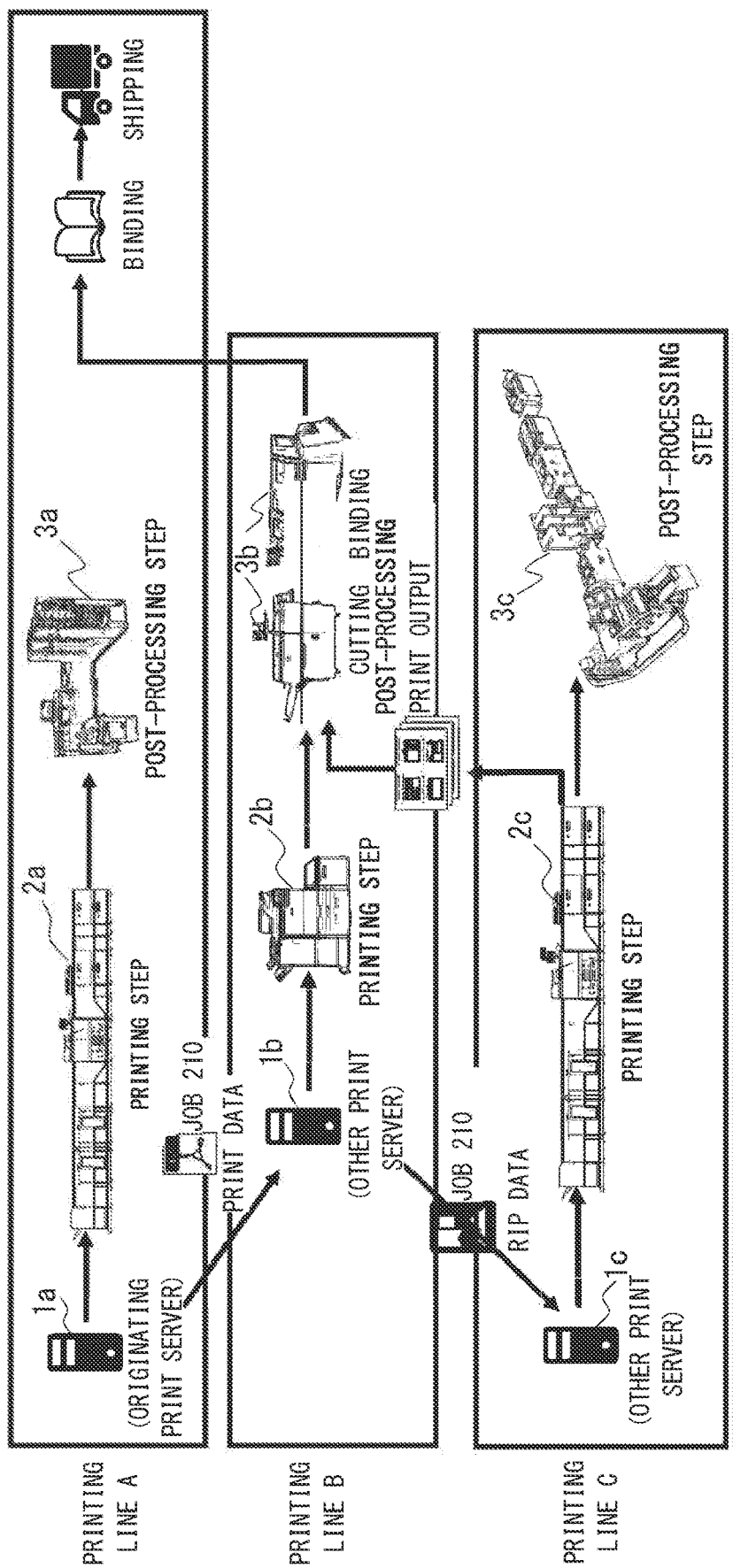
FIG. 7 is a conceptual diagram of job processing request and job delivery in the job distributed execution process as shown in FIG. 6.

Next, with reference to FIGS. 6 and 7, a job distribution execution process by the print server 1 according to the embodiment of the present disclosure is described.

In the job distribution execution process of the present embodiment, the storage unit 19 stores capability information 200 indicating the processing capability of rasterizing process, printing process, and post-processing process. Then, the processing requirement of the job 210 are confirmed based on the stored capability information 200.

Based on this, a combination of one of the plurality of print servers 1, the printing apparatus 2, and the post-processing apparatus 3, which are processable the job 210, is determined. Then, the job 210 is transmitted to each apparatus according to the combination determined to be processable, and the processing is requested.

In the job distributed execution process according to the present embodiment, as a representative example, the print server 1a of the print line A (site) is set as the originating print server (processing request side), and the control unit 10 of the print server 1a mainly executes a program stored in the storage unit 19 in cooperation with each unit and using hardware resources.

With reference to the flowchart of FIG. 6, details of the job distribution execution process are described step by step as follows.

(Step S100)

Firstly, the processing determination unit 100 performs job acquisition process.

The processing determination unit 100 acquires a job 210 to be subjected to peer-to-peer distributed processing from an inter-site management system upstream of the industrial printing system X, the administrator terminal, the prepress apparatus, or the like. At this time, the administrator terminal may be caused to execute a web browser or the dedicated application to access the manuscript submitted by the manuscript submission terminal. Thus, the job 210 may be created by presenting the manuscript to the user through a GUI (Graphical User Interface) on the screen of the dedicated application. Here, the processing determination unit 100 may automatically generate and include a job ticket 350 including settings for each page in the created job 210. In the present embodiment, the processing determination unit 100 may select a combination of a plurality of apparatuses for the printing step and the post-processing step in each job 210 and make them available.

In the example of the present embodiment, the print server 1a that has acquired this job 210 is the originating print server (the print server 1 on the processing request side).

(Step S101)

Then, the processing determination unit 100 performs capability addition and change process.

Here, the processing determination unit 100 can add and/or change the capability information 200 according to the content of the job 210.

Specifically, the processing determination unit 100 can add and/or change the capability information 200 before generation, during generation, or at the time of acquiring the job 210. That is, the processing determination unit 100 can add or change the capabilities shared among the print servers 1 in each capability of the default capability information 200.

In other words, the processing determination unit 100 can be set to add necessary capabilities and not to share unnecessary capabilities from the capability information 200 depending on the contents of the job 210, depending on the printing target application, or the like. For example, when performing "transaction printing" in variable printing, if only monochrome printing is performed, the capability related to color printing can be deleted from the capability information 200.

Here, the processing determination unit 100 may analyze the contents of the job 210 and add or change the shared capabilities in the capability information 200. Further, the setting of the capability information 200 may be confirmed and changed by the user through the GUI of the dedicated application.

When this capability information 200 is added and/or changed, it may be transmitted from the originating print server to the other print servers 1 and shared.

(Step S102)

Then, the processing determination unit 100 performs a capability substitution setting process.

The processing determination unit 100 sets the substitution setting 330 of the capability information 200 for the capability that can be substituted by another.

Specifically, the processing determination unit 100 performs a setting to replace the replaceable capability. For example, in the case of rasterizing process, if the other print server does not have the capability designated in the job 210 regarding a color profile, a spot color, a font, or the like, and if the substitution is possible, the processing determination unit 100 sets as the substitution is possible in the substitution setting 330. Similarly, the processing determination unit 100 sets the substitutional capability in the substitution setting 330 for the printing process and the post-processing process.

Here, the capability information 200 in which the substitution setting 330 is set may also be transmitted from the originating print server to the other print servers 1 and shared.

(Step S103)

Then, the processing determination unit 100 performs processing determination process.

The processing determination unit 100 analyzes the job 210 based on the capability information 200 stored in the storage unit 19 and determines processing requirement.

Specifically, the processing determination unit 100 determines processing requirement in the printing step and the post-processing step from the job information 340, the job ticket 350, the print data 360, and the printing resources 370 included in the job 210.

For example, the processing determination unit 100 determines processing requirement based on the type of the job 210 and other information in the job information 340.

Also, the processing determination unit 100 analyzes the job ticket 350 such as JDF and/or JMF, and determines color profile designation, imposition designation, paper designation, bookbinding designation, or the like, as designated print instruction attributes.

Furthermore, when the print data 360 is PDF, or the like, the processing determination unit 100 determines attributes specified in the print data 360 by performing a preflight check. This designated attribute may be spot color designation, font designation, or the like.

In addition, processing determination unit 100 can also determine necessary processing requirement from print resource 370.

When confirming the processing requirement, the processing determination unit 100 also determines whether or not a commercial library and plug-in processing are designated.

After determining the processing requirement, the processing determination unit 100 reads out the capability information 200 of each print server 1 stored in the storage unit 19. At this time, if the capability information 200 of the print server 1 of each site has not been acquired, the processing determination unit 100 may acquire it from each site that can be linked and store it in the storage unit 19. At this time, the processing determination unit 100 can acquire and share the added and/or changed capability information 200 as described above.

Then, the processing determination unit 100 selects one of the plurality of print servers 1 (the other print server), the printing apparatus 2, and the post-processing apparatus 3 that satisfy the processing requirement of the job 210.

Specifically, the processing determination unit 100 determines a combination of the print server 1, the printing apparatus 2, and the post-processing apparatus 3 that can process the target job 210. At this time, the processing determination unit 100 refers to the capability information 200 and selects the print server 1 that fulfills the processing requirement of the rasterizing process capability 300. Similarly, the processing determination unit 100 also selects the printing apparatus 2 that satisfies the processing requirements of the printing process capability 310 in the printing step. Similarly, the processing determination unit 100 also selects the post-processing apparatus 3 that satisfies the processing requirements of the post-processing process capability 320 in the post-processing step. The processing determination unit 100 stores these selections in the storage unit 19 as the combination data 220.

In an example of the present embodiment, the processing determination unit 100 can set combination data 220 such as "print server 1*b*, printing apparatus 2*c*, post-processing apparatus 3*b*" as a combination capable of processing the job 210.

On the other hand, if any one of the rasterizing process capability 300, the printing process capability 310, and the post-processing process capability 320 does not fulfill the processing requirement, the processing determination unit 100 determines that there is no combination, and sets "none" to the combination data 220.

(Step S104)

Then, the processing determination unit 100 determines whether or not there is a combination. The processing determination unit 100 determines Yes if the combination of the print server 1, the printing apparatus 2, and the post-processing apparatus 3 is set in the combination data 220. The processing determination unit 100 determines No if "none" is set in the combination data 220, that is, if there is no combination that fulfills the processing requirement.

In the case of Yes, the processing determination unit 100 advances the process to step S106.

In the case of No, the processing determination unit 100 advances the process to step S105.

(Step S105)

If the combination data 220 is set to "none", the processing determination unit 100 performs the substitution setting change presentation process. In this process, the processing determination unit 100 sets the substitution because there is no combination that fulfills the process requirement of the job 210.

Specifically, the processing determination unit 100 changes the combination data 220 based on the substitution setting 330 and presents it to the user as a candidate.

In the present embodiment, the processing determination unit 100 can present the GUI of the dedicated application for the capability that is set to be substitutable. For example, the processing determination unit 100 displays a list of the capabilities that does not fulfill the processing requirement and the processing capabilities of each apparatus. This allows the user to set the suitable combination.

For example, if the "PANTONE" color designated as the spot color is not installed in any print server 1, the processing determination unit 100 displays a list of available spot color(s) in each print server 1. In such case, the process determination unit 100 can present as a candidate which print server 1 to change is closer to the intention of the job. For example, the processing determination unit 100 can display the print server 1 that can use the "DIC" spot color as a candidate higher than the print server 1 that can only use CMYK colors. This allows the user to select the substitute print server 1 as the other print server.

The processing determination unit 100 sets the user's selection in the combination data 220 and stores it in the storage unit 19.

(Step S106)

Then, the processing management unit 110 performs processing request process.

The processing management unit 110 transmits the job 210 to each apparatus according to the generated combination data 220 to request processing. Specifically, the processing management unit 110 instructs to send and receive the job 210 between the print servers 1 between sites so that the print server 1, the printing apparatus 2, and the post-processing apparatus 3 set in the combination data 220 respectively process the job 210. As a result, the job 210 is executed for rasterizing process, printing process, and post-processing process at each set site. The processing management unit 110 may encrypt the job 210 and request processing to be transmitted to the other print server 1 at the time of sending and receiving.

Furthermore, before and after the processing request and actual processing, the processing management unit 110 transmits and receives processing status notification and completion notification of the job 210 between the print servers 1 corresponding to the combination. That is, the processing management unit 110 can manage the processing status and the completion of the processing between the originating print server and the print server 1 (the other print server) of the apparatus that performs the processing.

Specifically, the processing management unit 110 of the originating print server acquires the status of the rasterizing process, the printing process, and the post-processing process from the other print servers 1 as a process status notification. These notifications can be broadcasted and shared with the print servers 1. This enables the print servers 1 to share the processing status of the job 210.

With reference to FIG. 7, an example of requesting process according to combination data 220 and transferring job 210 is described.

For example, if the print server 1*a* in the print line A is the originating print server and the combination data includes print server 1*b*, printing apparatus 2*c*, and post-processing apparatus 3*b*, the job 210 is transferred as shown in T1 to T7 as follows:

(T1) The print server 1*a* acquires the job 210.

(T2) The processing management unit 110 of the print server 1*a* transmits the job 210 for rasterizing process to the print server 1*b* as the other print server according to the combination data 220. In addition, at this time, the processing management unit 110 of the print server 1*a* can also transmit the print data 360 and the job ticket 350 to the print server 1*b*.

(T3) The print server 1*b* rasterizes the job 210. The print server 1*b* can notify the print server 1*a* of the processing status of rasterizing process.

(T4) The print server 1*b* transmits data such as PDF including bitmap data that is rasterizing processed, or the like, (hereinafter referred to as "RIP data") to the print server 1*c*. At this time, the print server 1*b* notifies the print server 1*a* of the completion status of the rasterizing process.

The print server 1*b* notifies the print server 1*a* that the RIP data has been sent to the print server 1*c* as a processing status notification.

On the other hand, if the rasterizing process results in an error, the print server 1*b* notifies the error to the print server 1*a* as a process status notification. In this case, the print server 1*b* does not need to send the RIP data to the print server 1*c*.

(T5) As the printing step, when receiving the RIP data, the print server 1*c* prints the job 210 with the printing apparatus 2*c*.

The print server 1*c* transmits a processing status notification of printing process to the print server 1*a*.

(T6) As the post-processing step, the output matter that is printed (hereinafter referred to as the "printed output") is sent to the post-processing apparatus 3*b* for post-processing.

The print server 1*c* transmits a printing processing completion notice to the print server 1*a*.

The print server 1*c* notifies that the printed output has been sent to the post-processing apparatus 3*b*, and it sends the job ticket 350 for post-processing to the print server 1*b*.

The print server 1*c* notifies the print server 1*a* that the printed output has been sent to the post-processing apparatus 3*b* as a completion notification.

On the other hand, if an error occurs in the printing process, the print server 1*c* notifies the error to the print server 1*a* as a process status notification.

(T7) The printed output that is performed post-processing is returned to the printing line A, and bookbinding, packing, and delivery in the printing line A are performed. At this time, the shipping server 4 also performs shipping process.

The print server 1*b* notifies the processing status notification and the completion notification of the post-processing to the print server 1*a*.

The print server 1*b* notifies the print server 1*a* that the post-processed print output has been sent to the print line A.

On the other hand, if the post-processing results in an error, the print server 1*b* notifies the error to the print server 1*a* as a processing status notification.

By processing in this manner, the print server 1*a*, which is the originating print server of the print line A, and the print server 1*b* of the print line B and the print server 1*c* of the print line C, which are the other print servers, can be handed over and processed the job 210 up to the order.

In addition, the processing management unit 110 of the originating print server can also adjust the processing request based on the status of the schedule information.

Furthermore, after these processes are completed, the process management unit 110 may delete the jobs 210 sent to other print servers.

With the above, the job distribution execution process according to the embodiment of the present disclosure completes.

As configured in this way, the following effects can be obtained.

In typical production printing, there is a case where a plurality of printing apparatuses distributes and processes printing in order to process a large amount of printing in a short period of time. Such distributed processing requires a management server that transmits and manages print data to the plurality of printing apparatuses.

On the other hand, in digital printing, which requires the processing of jobs of various types and small lots, there have been cases where jobs requiring various processing have been submitted.

In a typical technique, when performing distributed processing, the print server, printing apparatus, and post-processing apparatus at the distribution destination must all have the capability to process the requested job.

However, with such a configuration, there are cases where distributed processing cannot be performed in one printing line (site) that includes a print server, a printing apparatus, and a post-processing apparatus. This is because print servers, printing apparatuses, and post-processing apparatuses do not always have the same processing capability for rasterizing process, printing process, and post-processing process.

Therefore, in the production printing, there is a demand for a technology that performs flexible and efficient distributed processing.

On the other hand, the industrial printing system X according to the present embodiment is an industrial printing system for production printing having a plurality of print servers 1 for distributed processing of a job 210, and each of the plurality of print servers 1 including: a storage unit 19 that stores capability information 200 indicating processable capability in rasterizing process, printing process, and post-processing process; a processing determination unit 100 that confirms a processing requirement of the job 210 based on the capability information 200 stored in the storage unit 19 and determine a combination of one of the plurality of print servers 1, a printing apparatus 2, and a post-processing apparatus 3 capable of processing the job 210; and a processing management unit 110 that transmits the job 210 to each apparatus to request processing according to the combination determined to be processable by the processing determination unit 100.

With this configuration, the present disclosure can provide a peer-to-peer industrial printing system that eliminates the need for a management server and allows flexible distributed processing between the print servers 1. On this basis, flexible output management can be performed. That is, for the target job 210, the print server 1, the printing apparatus 2, and the post-processing apparatus 3 can be used in a combination that can be processed. Therefore, even if the processing capabilities of the print server 1, the printing apparatus 2, and the post-processing apparatus 3 at the distribution destinations are different, the rasterizing process, the printing process, and the post-processing can be flexibly distributed and executed.

In the industrial printing system X according to the present embodiment, the processing determination unit 100 confirms a print instruction attribute of a job ticket 350 and a designated attribute of job information 340 for the job 210 and determines the combination.

With this configuration, the processing requirement of the job 210 can be determined, easily, and the appropriate combination can be determined.

In the industrial printing system X according to the present embodiment, the capability information 200 includes substitution setting 330 for substitutable capabilities; and when there is no combination that fulfills the processing requirement, the processing determination unit 100 makes a change based on the substitution setting 330 and presents the change to the user.

With this configuration, even if there is no combination that fulfills the processing requirement for the print server 1, printing apparatus 2, and post-processing apparatus 3, the user can make settings. Specifically, even if the job 210 has detailed designations but the processing requirement is not important, or the like, the distributed processing can be efficiently performed without changing the job 210 itself.

Furthermore, in the industrial printing system X according to the present embodiment, it can be configured as each print server 1 by storing the capability information 200 and installing the dedicated application, or the like, in the existing print server 1. Then, the print servers 1 can cooperate with each other on the peer-to-peer basis. Therefore, the sites of existing companies, or the like, can easily be cooperated and improve the efficiency of production printing.

In the industrial printing system X according to the present embodiment, the processing management unit 110 transmits and receives a processing status notification and a completion notification of the job 210 between the print servers 1 corresponding to the combination and manages the processing of the job 210.

By configuring in this way, even if the job 210 is processed with distribution, the progress status and completion status can be confirmed at the originating print server. Therefore, it is possible to reliably execute the distributed processing among the print lines and to reduce the labor. Furthermore, the processing request due to delay, or the like, can be adjusted. As a result, the time and effort of manual adjustment can be reduced, the processing of the job 210 can be made efficient, and the running cost can be reduced.

In the industrial printing system X according to the present embodiment, the capability information 200 includes information on a commercial library and plug-in processing in the rasterizing process, and the processing determination unit 100 determines the combination according to the information on the commercial library and the plug-in processing.

By configuring in this way, even if a commercial library, or the like, is required to process the job 210, it can be applied. That is, commercial libraries are not necessarily provided with every print line. Therefore, even if the job 210 requires a commercial library, or the like, it can be processed in a printing line with the commercial library, and distributed processing can be performed more efficiently.

In the industrial printing system X according to the present embodiment, the processing determination unit 100 adds and/or changes the capability information 200 according to the content of the job 210.

By configuring in this way, depending on the content of the job 210, it is possible to add capabilities that are lacking for sharing in the default capability information 200, or to delete capabilities that is unnecessary for sharing. As a result, the capability information 200 can be efficiently shared among the print servers 1, and the combination of each apparatus can be easily determined. In addition, by not sharing unnecessary capability in the capability information 200, an effect of enhancing security can be expected.

[Other Embodiments]

In the above-described embodiment, an example was described in which the capability information 200 of a plurality of print servers 1 is stored in the originating print server or obtained from the other print server.

However, a configuration is also possible in which only the processing requirement of the job 210 are determined by the originating print server, and the determined processing requirement are transmitted to a plurality of print servers 1 to determine whether processing is possible. In this case, each print server 1 may determine whether processing is possible based on the processing requirement of the job 210 and the capability information 200 stored in its own storage unit 19.

With this configuration, it is possible to determine whether the job 210 can be processed without acquiring the capability information 200 of other print servers, and it can save the trouble of updating, or the like, the capability information 200 for each site.

In the above-described embodiment, after acquiring the job 210, adding and changing to the shared capabilities in the capability information 200 and substitution setting 330 are set.

However, the capability information 200 may be set before the job 210 is obtained or when the job 210 is created, and the substitution setting 330 may be set.

By configuring in this way, when the job 210 is acquired, based on the capability information 200, the processing requirement can immediately be checked, and the combination can be determined.

Further, in the above-described embodiment, an example in which the other print server is determined from the originating print server without distinguishing between rasterizing process, printing process, and post-processing process in the job 210 has been described.

However, separate print servers 1 (groups) may be used for determining in the printing step and the post-processing step.

In addition, priority may be given to which apparatus should be used for rasterizing process, printing process, and post-processing process. This priority may be set based on the availability of schedule information, the number and performance of component apparatuses, cost, and other information.

By configuring in this way, the job 210 can be distributed to each site more efficiently.

Further, in the above-described embodiment, an example of requesting the other print server 1 to process the job 210 "as it is" has been described.

However, the job 210 itself can be changed according to the status notification, the completion notification, the error notification, or the like, for the job 210.

In this case, when adjusting the processing request due to the delay, for example, the number of pages, the color profile to be used, or the like, can be changed as the processible job 210 according to the substitution setting 330.

Alternatively, the job 210 itself can be divided, and the divided job 210 can be transmitted to the originating print server or a print server 1 other than the requested print server.

With this configuration, even if trouble occurs, the job 210 can be executed by distributed processing.

Also, in the above embodiments, an example of distributed peer-to-peer processing has been described.

However, each process of the present embodiment can also be applied to a configuration by using a management server.

Further, the configuration and operation of the above-described embodiment are examples, and needless to say, they can be modified and executed as appropriate without departing from the aim of the present disclosure.

What is claimed is:

1. An industrial printing system for production printing having a plurality of print servers for distributed processing of a job, each of the plurality of print servers comprising:
   a storage unit that stores capability information indicating processable capability in rasterizing process, printing process, and post-processing process;
   a processing determination unit configured to confirm a processing requirement of the job based on the capability information stored in the storage unit and determine a combination of one of the plurality of print servers, a printing apparatus, and a post-processing apparatus capable of processing the job; and
   a processing management unit configured to transmit the job to each apparatus to request processing according to the combination determined to be processable by the processing determination unit; wherein the processing management unit is configured to perform said transmit the job to each apparatus by instructing a print server of the plurality to transfer the job to the one of the plurality of print servers;

the capability information includes information on a commercial library and plug-in processing in the rasterizing process;

the processing determination unit is configured to determine the combination according to the information on the commercial library and the plug-in processing; and the information of the plug-in processing includes processing and capability information of imposition, preflight, and preflight profile.

2. The industrial printing system according to claim 1, wherein:

the processing determination unit confirms a print instruction attribute of a job ticket and a designated attribute of job information for the job and determines the combination.

3. The industrial printing system according to claim 1, wherein:

the capability information includes a substitution setting for substitutable capability;

when there is no combination that fulfills the processing requirement, the processing determination unit makes a change based on the substitution setting and presents the change to a user; and the substitution setting includes a setting in which a color profile, a spot color, a font is possible to be substituted or not.

4. The industrial printing system according to claim 3, wherein:

the process determination unit presents as a candidate which print server to change is closer to match intention of the job.

5. The industrial printing system according to claim 1, wherein:

the processing management unit transmits and receives a processing status notification and a completion notification of the job between the print servers corresponding to the combination and manages the processing of the job; and status of processing for the job is shared with the print servers.

6. The industrial printing system according to claim 1, wherein:

the processing determination unit adds and/or changes the capability information according to content of the job; wherein a necessary capability is added and an unnecessary capability is not shared in the capability information depending on a content of the job and a printing target application.

7. The industrial printing system according to claim 1, wherein:

the job includes PDF data containing bitmap data that has been rasterizing processed is sent between the print servers.

8. A print server that performs distributed processing of a job in an industrial printing system that performs production printing, comprising:

a storage unit that stores capability information indicating processable capability in rasterizing process, printing process, and post-processing process;

a processing determination unit configured to confirm a processing requirement of the job based on the capability information stored in the storage unit and determine a combination of one of a plurality of print servers, a printing apparatus, and a post-processing apparatus capable of processing the job; and a processing management unit configured to transmit the job to each apparatus to request processing according to the combination determined to be processable by the processing determination unit;

wherein the processing management unit is configured to perform said transmit the job to each apparatus by transferring the job to the one of the plurality of print servers;

wherein the capability information includes information on a commercial library and plug-in processing in the rasterizing process;

wherein the processing determination unit is configured to determine the combination according to the information on the commercial library and the plug-in processing; and wherein the information of the plug-in processing includes processing and capability information of imposition, preflight, and preflight profile.

9. The print server according to claim 8, wherein:

the processing determination unit confirms a print instruction attribute of a job ticket and a designated attribute of job information for the job and determines the combination.

10. The print server according to claim 8, wherein:

the capability information includes a substitution setting for substitutable capability;

when there is no combination that fulfills the processing requirement, the processing determination unit makes a change based on the substitution setting and presents the change to a user; and the substitution setting includes a setting in which a color profile, a spot color, a font is possible to be substituted or not.

11. The print server according to claim 8, wherein:

the processing management unit transmits and receives a processing status notification and a completion notification of the job between the one of the plurality of print servers corresponding to the combination and manages the processing of the job; and status of processing for the job is shared with the one of the plurality print servers.

12. The print server according to claim 8, wherein:

the processing determination unit adds and/or changes the capability information according to content of the job; and a necessary capability is added and an unnecessary capability is not shared in the capability information depending on a content of the job and a printing target application.

13. A process management method performed by an industrial printing system for production printing having a plurality of print servers for distributed processing of a job, comprising the steps of:

storing capability information indicating processable capability in rasterizing process, printing process, and post-processing process;

confirming a processing requirement of the job based on the stored capability information;

determining a combination of one of the plurality of print servers, a printing apparatus, and a post-processing apparatus capable of processing the job; and transmitting the job to each apparatus to request processing according to the combination determined to be processable by transferring the job to the one of the plurality of print servers; wherein the capability information includes information on a commercial library and plug-in processing in the rasterizing process, the step of determining a combination comprises determining the combination according to the information on the commercial library and the plug-in processing; and the information of the plug-in processing includes processing and capability information of imposition, preflight, and preflight profile.

14. The process management method according to claim 13, further comprising:

confirming a print instruction attribute of a job ticket and a designated attribute of job information for the job and determines the combination.

15. The process management method according to claim 13, wherein:

the capability information includes a substitution setting for substitutable capability; and the method further comprises making, when there is no combination that fulfills the processing requirement, a change based on the substitution setting and presents the change to a user;

wherein the substitution setting includes a setting in which a color profile, a spot color, a font is possible to be substituted or not.

16. The process management method according to claim 13, further comprising:

transmitting and receiving a processing status notification and a completion notification of the job between the print servers corresponding to the combination and manages the processing of the job by sharing status of the job with the one of the plurality of servers.

17. The process management method according to claim 13, further comprising:

adding and/or changing the capability information according to content of the job; wherein a necessary capability is added and an unnecessary capability is not shared in the capability information depending on a content of the job and a printing target application.

* * * * *